METHOD OF FABRICATING MAGNETIC STORAGE DEVICES

Filed Dec. 23, 1965 4 Sheets-Sheet 1

INVENTORS
EDWARD A. BARTKUS
JAMES M. BROWNLOW
KURT R. GREBE

BY [signature]

ATTORNEY

METHOD OF FABRICATING MAGNETIC STORAGE DEVICES

Filed Dec. 23, 1965 4 Sheets-Sheet 3

United States Patent Office 3,392,441
Patented July 16, 1968

3,392,441

METHOD OF FABRICATING MAGNETIC STORAGE DEVICES

Edward A. Bartkus, Boulder, Colo., and James M. Brownlow, Crompond, and Kurt R. Grebe, Beacon, N.Y., assignors to International Business Machines Corporation, Armonk, N.Y., a corporation of New York Filed Dec. 23, 1965, Ser. No. 515,937
10 Claims. (Cl. 29—604)

ABSTRACT OF THE DISCLOSURE

The magnetic storage elements fabricated by the disclosed method are extremely small ferrite storage cores mounted within a larger block or core of nonmagnetic ferrite material. In carrying out the process a ferrite paint, including the storage material, is coated on a tubular substrate. On top of this first layer, a second layer is coated. This second layer is a barrier material, which is an inert material such as MnO. A third layer is then coated including a nonmagnetic ferrite which has shrinkage characteristics similar to that of the first layer containing magnetic ferrite. A plurality of tubes of this type are mounted in a wax block and the block is sliced into a plurality of individual thin units each containing a number of the core structures. Prior to the slicing, the tubular substrates are removed. After the slicing the cores are removed from the wax block and sintered. During this sintering operation the MnO barrier layer serves to prevent chemical interaction between the inner layer of the ferrite storage material and the outer layer of nonmagnetic ferrite which serves as a support for the storage layer. Further, during this sintering operation, since both the inner and outer layers have a similar shrinkage characteristic, crackage in the core structures is prevented. In the application of the method to the preparation of bulk memory structures rather than individual cores, after the layers of ferrite storage material and MnO are placed on the substrate, the tubular members are cast in a block of nonmagnetic ferrite which is to form the supporting structure. Thereafter the tubular substrates are removed, the block is sliced, and the sintering operations are performed, as before, to obtain a plurality of units each containing a number of individual storage elements.

The present invention relates to magnetic devices and more particularly to an improved method of fabricating small ferrite storage cores both in discrete and in bulk form.

Magnetic storage devices are widely used in both small and large scale memories, primarily in computers but also in other applications. Though other structures such as magnetic thin film devices have received much attention because of their potential for high speed, the primary storage element presently employed in commercial applications is the toroidal ferrite core. In the development of ferrite cores as storage elements there has been continual emphasis on providing cores and core memories with higher speeds of operation at lower costs. This emphasis has resulted not only in improvements in the ferrite material from which the cores are fabricated but also in the fabrication of small cores, more specifically cores with a small internal and external diameter and, therefore, a smaller annular thickness. This follows from the fact that the smaller the volume of magnetic material to be switched, the faster is the switching operation. Further, if the internal diameter of the switching core is decreased, the size of the current pulse, which must be applied to a winding threading the cores to achieve switching is also decreased.

The conventional way of fabricating magnetic core storage elements is by a pressing and molding method wherein the ferrite powder is placed in a mold having a plurality of cavities which form the pressed material into the desired toroidal shapes. Once in this form the cores are heat treated to produce the ferrite ceramic having the required storage characteristics. Though this method has been successfully employed to produce extremely small magnetic cores, a limit has been reached at an inner diameter of about 7.5 mils and an annular thickness of 2 mils.

It has been suggested that storage cores be fabricated in a multi-layer structure consisting, for example, of an inner layer of the ferrite storage material and an outer supporting layer of non-magnetic material. These two layers are formed into an integral ceramic structure. However, the pressing method described above does not lend itself easily to fabricating multi-layered cores.

In another approach to the problem of fabricating large numbers of small storage cores, the ferrite storage material is first formed into a tube and the tube sliced to provide the individual cores. The tube is formed either by extrusion or by coating a tubular substrate with a coating of the ferrite storage material, allowing the coating to dry, and removing the substrate. This method has also been applied to the fabrication of bulk memory structures, which include a number of storage elements in an integrated structure. The bulk type structures are made by placing a number of tubes of ferrite storage material within a supporting block and thereafter slicing the block to provide an array of storage elements in a single unitary structure.

Prior art pertinent to the latter types of approaches is listed below.

British Patent No. 833,958 published May 4, 1960; U.S. Patent No. 3,016,597 issued Jan. 16, 1962 to R. A. Denes; U.S. patent application Ser. No. 206,306 filed June 29, 1962, now Patent No. 3,231,661 and assigned to the assignee of the subject application.

However, none of these methods have been successful in producing extremely small storage devices which exhibit in reproducible form the very high quality storage characteristics that are necessary to achieve the desired high speed of operation in large scale memories. This problem is complicated by the fact that if the cores are made smaller, smaller signals are used to drive the cores. Smaller output signals are then realized to indicate the storage state of the cores. As a result, the operating margins for the cores in the memory are very severe. The requirement for extremely good and reproducible magnetic characteristics is more stringent than for conventional cores.

Following the principles of the present invention, extremely small core structures which meet these stringent requirements have been produced. These cores are multilayered structures produced by first coating a tubular substrate with a layer of a paint which contains the ferrite powder which is to form the storage element. Over this first layer a second layer is applied. This layer includes a ceramic powder termed a barrier material since it is an inert material whose function is to prevent interaction between the ferrite storage material and a subsequently applied ferrite supporting layer during the sintering operation used to produce the ceramic structures including the small cores of the storage material exhibiting the desired magnetic characteristics. After the two layers of storage material and barrier material have been applied, a third layer including the non-magnetic ferrite suport material is applied. The tubular structure can then be individually sliced or preferably a number of tubular structures are cast in a wax block and sliced together. This slicing is done with the cores in a green state but having sufficient strength to support themselves in tubular form. The cylindrical substrate on which the cores are originally supported is removed prior to slicing the cores. The cores are removed from the wax block and then sintered. It is during this sintering operation that the barrier layer described above prevents interaction between the two layers of ferrite material and allows the production of extremely small cores with reproducible high quality magnetic characteristics. Though this method can be practiced without using a barrier layer, it has been found that the magnetic characteristics are more suitable for many memory applications when the barrier layer is used.

If a bulk type device is desired, the tubular structure with the ferrite storage layer and barrier layer applied are cast in a non-magnetic ferrite block which is sliced after casting with all of the material in a green state. Firing is then carried out with the barrier layer performing the same function as before to produce a unitary structure including a number of very small thin walled cores having the desired high quality magnetic characteristics.

It is, therefore, an object of the present invention to provide a method of producing extremely small storage elements which can be operated in magnetic memory arrays.

It is a further object to provide these storage elements by a process which is relatively inexpensive and reproducibly yields cores with good magnetic characteristics which are capable of being used in very high speed memories.

It is a further object of this invention to provide a method of producing storage elements of the above described type not only in the discrete form of individual magnetic cores but also in bulk type structures which include a number of storage elements in a single unitary structure.

The foregoing and other objects, features and advantages of the invention will be apparent from the following more particular description of the preferred embodiments of the invention, as illustrated in the accompanying drawings.

FIGS. 1A through 1I diagrammatically illustrate the steps used to fabricate extremely small ferrite cores in accordance with the principles of the invention. The fabrication procedure is first described with reference to these figures and later in the specification more details are given as to the apparatus used in fabricating the cores as well as the materials out of which the cores are fabricated.

Figures 1A, 1B, 1C, 1D:
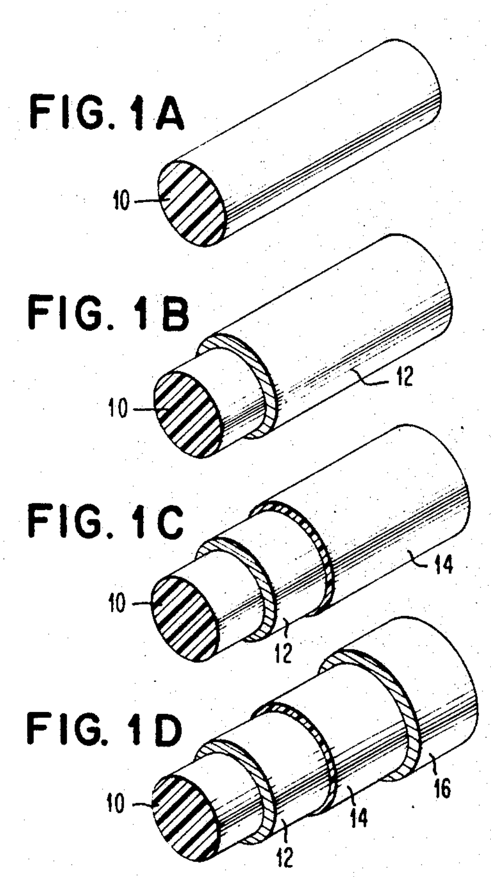
FIGS. 1A–1I depict the successive forms of the structure in practicing one preferred method of the present invention to produce discrete cores.

The first step in the process is to take a tubular substrate in the form of a filament 10 of nylon and coat the filament with a ferrite paint 12, as shown in FIGS. 1A and 1B. The nylon filament is extremely small having a diameter of about 6 mils and only a very thin layer of the ferrite paint 12 is applied since it is this material which is to form the storage medium in the completed device. After the coating 12 has dried (FIG. 1C) a coating 14 is applied which is a non-magnetic material that serves as a barrier during subsequent firing operations between ferrite memory layer 12 and the supporting layer of non-magnetic ferrite material. This supporting layer is shown to be applied at 16 in FIG. 2D and is in the form of a ferrite paint which is non-magnetic.

A group of filaments 10 coated with the three tubular layers 12, 14 and 16 are then arranged in parallel on a Teflon block and potted in wax. After the wax has hardened into a block 20 (FIG. 1E), the nylon filaments are extracted merely by pulling them from one end. The magnetic material 12 immediately surrounding the filament 10 at this time has not been cured. The same is true for the other layers 14 and 16, but they have dried to a point where they form self-supporting tubes which are held in the wax block 20. It has been found that it is possible to merely extract the nylon filaments from this structure by pulling them out of the block.

Figure 1E:
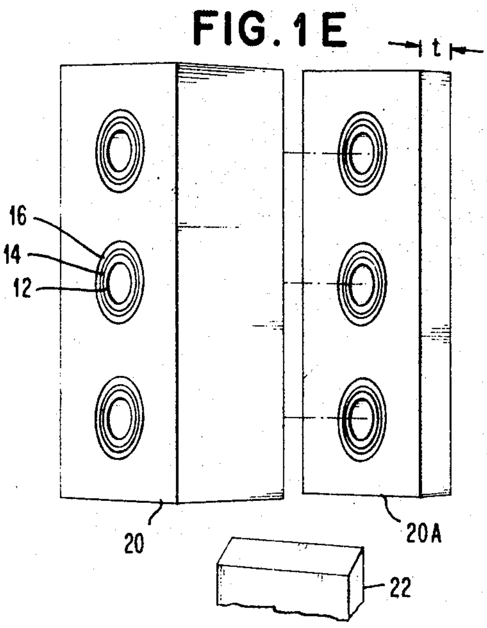

The block 20 with the tubular shells formed of layers 12, 14, and 16 extending through the block is shown in FIG. 1E. Though only three of the multi-layered tubes are shown to simplify the illustration, many more may be embedded in a single wax block. A bar 20A of the block 20 is shown in FIG. 1E to have been sliced away using a cutting instrument 22. The Teflon block, mentioned above but not shown in FIG. 1E, in which the tubular members are potted serves as a support during this cutting operation. Particular note should be made of the fact that this cutting operation is carried out while the multi-layered tubes are in a green and unfired condition so that it is possible to make very fine slices through the tubes without damaging the multi-layered core structure. The cutting operation is carried out on a milling machine with the cutting instrument 22 in FIG. 1E mounted on the spindle of the machine. The block is mounted on the bed of the machine and the spindle lowered until the cutting instrument passes through the tubes in the wax block.

Figure 1F:
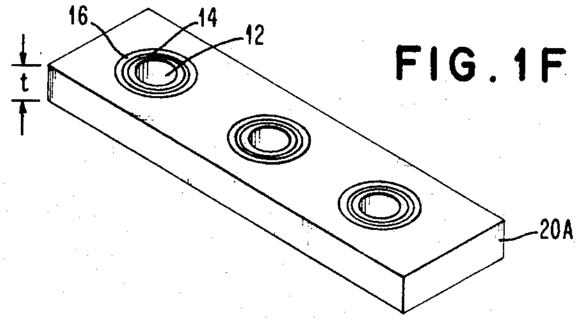

The cutting operation is repeated to provide a number of slices such as that shown in FIG. 1E, each having a thickness which is determined by the height of the cores to be fabricated. After the completion of the cutting operation, the wax block including three multi-layer cores as shown in FIG. 1F is placed on filter paper and the excess wax is melted and drained off. This operation is accomplished very simply by heating to 100° to 125° C. with the melted wax being absorbed by the filter paper. It is necessary to carry out this step at this time in order to remove the organic matter of the wax from the green cores before binder drive off and firing operations which follow.

Figure 1G:
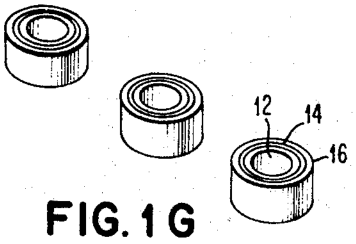

The individual green cores made up of the three layers 12, 14, and 16 as shown in FIG. 1G are then placed in a nickel boat, the inside of the boat having been coated with a fine slurry of $Mn_3O_4$ suspended in organic binder and previously fired to 1,000° C. This ceramic coating helps avoid sticking of the cores to the boat during firing. Binder drive-off is done by slowly heating the loaded boat to 600° C. over a 30 min. period. During the slow heat rise the organics in the cores are allowed to slowly pyrolyze and sublime without damaging said cores. Should the heat rise be too fast, distortion or ignition might occur resulting in both physical and chemical damage to the cores. Once the binder drive-off is completed, final firing can take place. The boat is inserted into a tube furnace, held at 920° for 10 minutes, then extracted and quenched by placing the boat on a cool surface such as an aluminum plate.

A second method of potting and cutting has been found to be adaptable to large production requirements. A large number of coated filaments (FIG. 1D) are laid parallel to each other and held together in a jig. Hot molten wax, low molecular weight polyethylene or a suitable organic, is cast around the bundle of coated filaments. The cast structure is then allowed to cool and solidify. Once the wax has solidified, the nylon is extracted as previously described. Cutting is done on a Microtome, this being a machine that holds the cast structure firmly in place. A moving blade traverses across the end of the casting perpendicular to it, shaving a slice every time it passes, each slice containing as many cores as there are tubes present in the casting. At the end of each cut, the casting is advanced a distance equal to the height of the green cores.

Figure 1H:
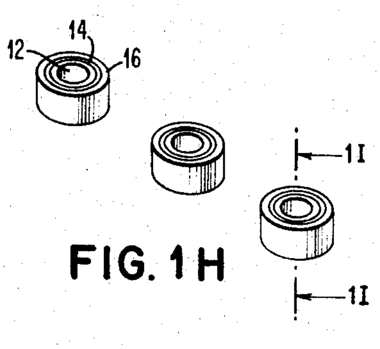

The cores after firing are shown in FIG. 1H somewhat reduced in size due to the shrinkage which occurs during this operation, it being noted that the materials of the three layers 12, 14, and 16 are chosen to avoid undue stresses in the cores during the firing operation. It is during the firing operation that the barrier layer 14 performs its function of preventing the outer non-magnetic ferrite layer 16 from reacting with the inner magnetic ferrite layer 12. When a barrier such as 14 is not employed, this reaction during firing between the adjacent layers of magnetic and non-magnetic material has been found to adversely affect the magnetic characteristics of the storage cores 12. Even though this reaction occurs only at the outer surface of layer 12, its effects on the magnetic characteristics are appreciable since the core itself is so small and has such a small annular thickness.

Figure 1I:
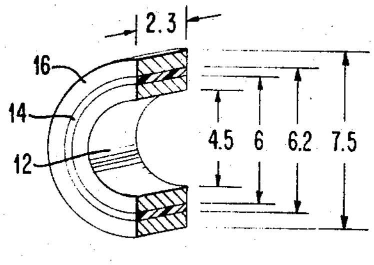

Cores fabricated by the process described above have been made with dimensions such as are shown in FIG. 1I. The storage cores formed by layer 12 have an inner diameter of 4.5 mils, an outer diameter of 6 mils and an annular thickness of .75 mil. The barrier layer 14 is only about 0.1 mil thick and the supporting layer of ferrite material about .65 mil in annular thickness. The height of the cores which is determined by the thickness of the cuts taken through the wax block is about 2.3 mils.

These cores having an inner diameter of 4.5 mils and an outer diameter of 7.5 mils are smaller than the smallest cores that are made by conventional molding techniques in which the entire core is fabricated of storage material. Further, even smaller cores than those shown in FIG. 1I, for example with the storage core having an inner diameter of 3 mils and an annular thickness of .6 mil can be made according to the method described above.

These smaller cores with their small annular thickness can be switched between magnetic states at much higher speeds and with smaller drive signals. Further, though the total energy available during switching results in less, total output signals have been realized which are sufficiently large to allow these cores to be used in large scale high speed memory arrays. Since the outer supporting layer of non-magnetic ferrite ceramic forms with the storage core an integral ceramic structure, the cores can be handled in the same manner as conventional cores. This integral structure is realized with the barrier layer serving its function during firing of preventing interaction between the different ferrites so that the process provides high yields of cores having the high quality magnetic characteristics required for high speed memory arrays.

A procedure similar to that described with reference to FIGS. 1A–1I may be employed to fabricate small core storage devices in bulk form, the final product being a plurality of cores embedded in a supporting block of non-magnetic ferrite.

This procedure is explained with reference to FIGS. 2A–2G. The first steps in this procedure are the same as that described above in FIGS. 1A–1I. A substrate in the form of a nylon filament 10 is first coated with a layer of magnetic material which is to serve as the storage material and then with a layer of barrier material 14. Rather than coating the individual filaments with a non-magnetic material to serve as a support, a number of the filaments coated with layers 12 and 14 are encased in a block of non-magnetic ferrite material 30, as indicated in FIG. 2D. In FIG. 2D the block 30 is shown after the nylon filaments have been removed. The tubes extending through the block are formed of the two layers 12 and 14 the support being provided by the block of non-magnetic ferrite which is to be a permanent part of the structure. Block 30 is sliced to provide bars 30A each including a row of individual cores as indicated in FIGS. 2D and 2E. The bars 30A are then heated to drive off the binder material and then cured during which some shrinkage occurs as indicated in FIG. 2F. As is the case with the process previously described, the cores of ferrite materials which are to form the actual storage element 12 and the non-magnetic ferrite which provides the support 30A are chosen so that undue stresses are avoided during the binder drive off and firing operations. The barrier layer 14 again serves to prevent interaction between the storage cores 12 and the supporting non-magnetic ferrite 30A during the firing operation.

Figures 2A, 2B, 2C:
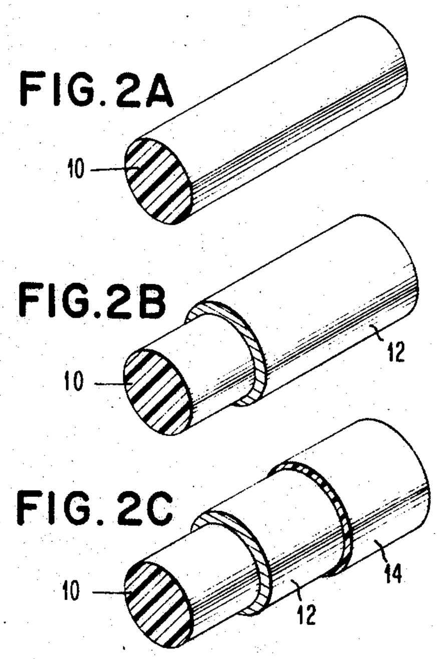
FIGS. 2A–2G depict the successive forms of the structure in practicing one preferred method of the present invention to produce a bulk type structure including a number of small core storage elements.
Figure 2D:
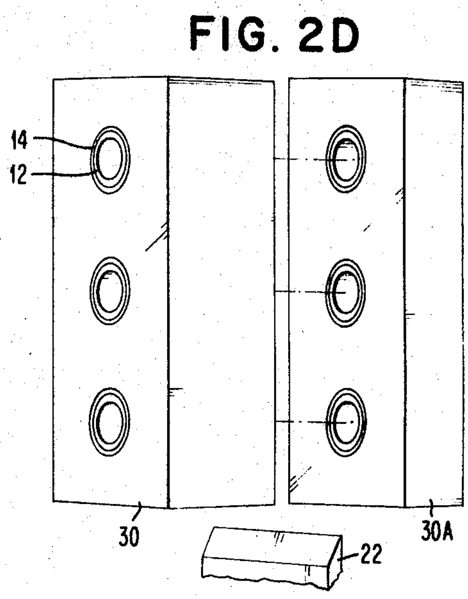
Figure 2E:
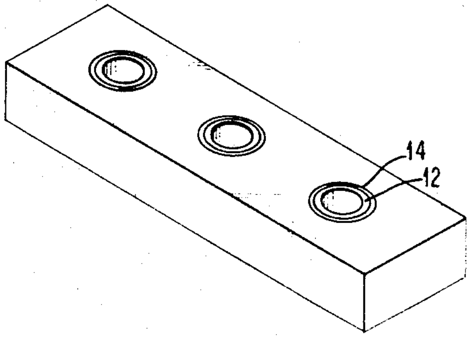
Figure 2F:
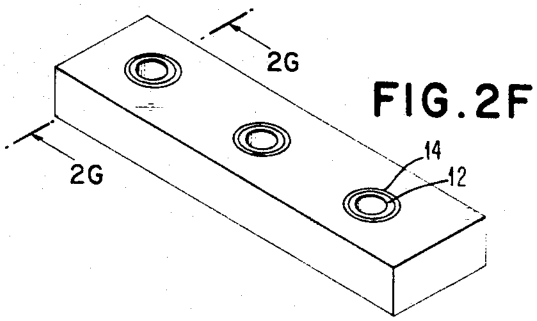
Figure 2G:
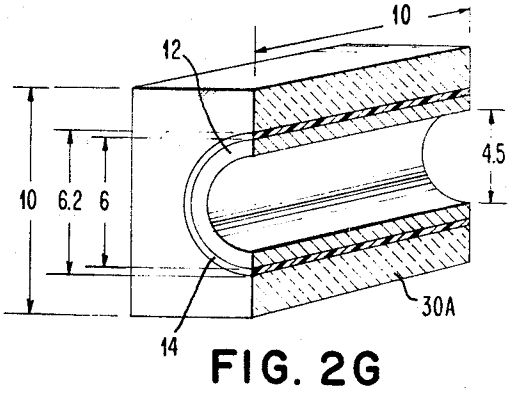

The dimensions of the core storage elements which have been produced by this method are illustrated in FIG. 2G. The height of the storage core 12 is larger than that of the discrete core of FIG. 1I being in the order of 10 mils, but the inner diameter and the annular thickness of storage cores are the same. Barrier layer 14 is also of approximately the same dimensions as that of the discrete core, but the support layer 16 of non-magnetic ferrite is somewhat larger. It is of course understood that the dimensions here given are merely for the purpose of illustration and structures of the form of FIG. 2F can be fabricated having smaller dimensions.

Figures 3A, 3B, 5:
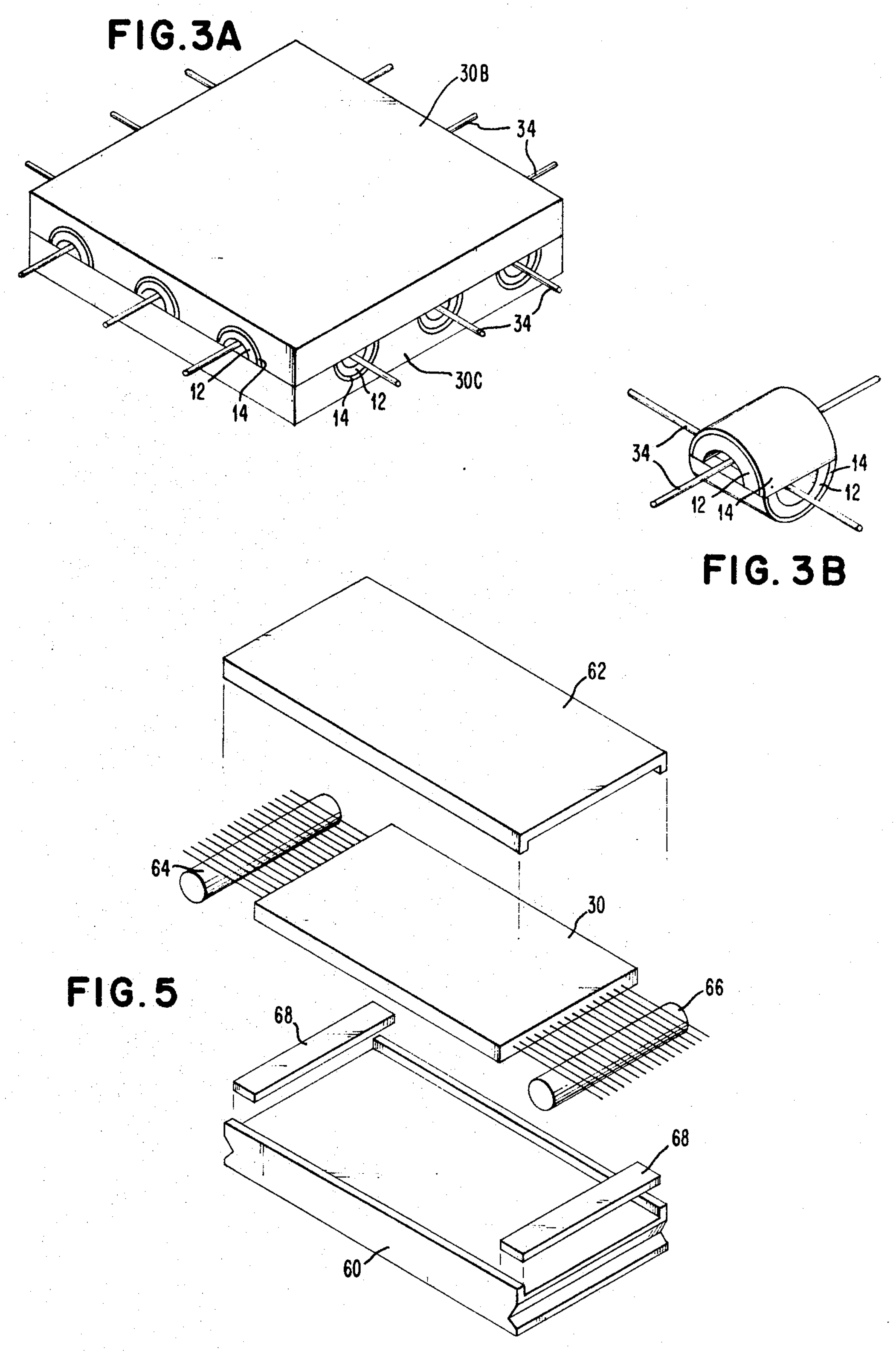
FIGS. 3A and 3B show another form of bulk storage elements produced with the method of the present invention.
FIG. 5 is an exploded somewhat diagrammatic view of the casting apparatus employed in carrying out the method of 2A–2G.

Another structure which can be fabricated in accordance with the principles of the subject invention is shown in FIG. 3. This structure is an array of storage elements with each storage element being formed of two half cores arranged at right angles with each other as is illustrated in FIGS. 3A and 3B. The numeral 12 is again used to indicate the portion of the structure which serves as the storage material. The process for making the structure of FIG. 3A is similar to that described with reference to FIGS. 2A–2G with the exception that after the block 30 of non-magnetic ferrite is formed as shown in FIG. 2D, rather than slicing the block to provide bars such as 30A, the block and tubes are cut in half along the diameter of the tubes to form the two sections 30B and 30C of FIG. 3. These two sections are then turned 90° to each other and cemented or laminated to each other and thereafter heated to drive off the binder material and fired to obtain the desired ceramic structure. At each of the intersections of the tubes a quadrature magnetic element of the type shown in FIG. 3B is formed. Sense and drive conductor 34 which are employed in operating the array may be arranged in sections 30A and 30B before the cementing and firing operations.

*Coating apparatus*

Figure 4B:
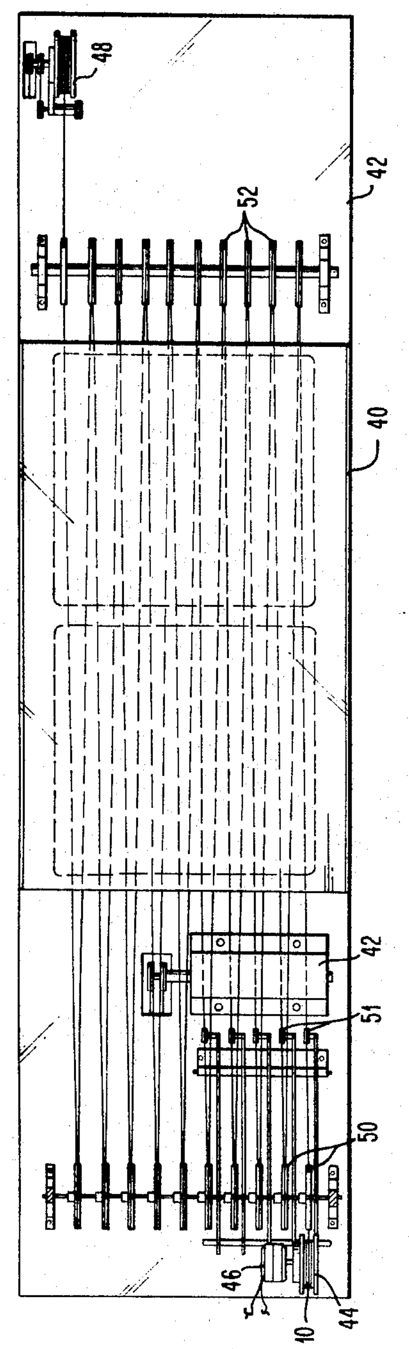
FIGS. 4A and 4B are side and top views of the apparatus used to coat the substrate during the practice of the invention.
Figure 4A:
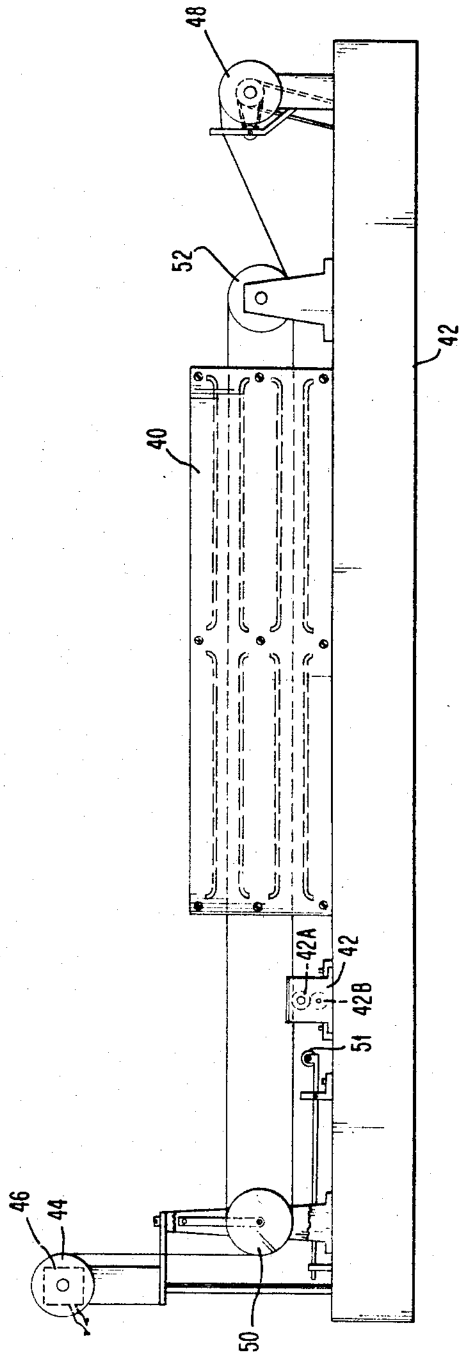

The coating apparatus which is used to apply this successive coating 12, 14, and 16 to the nylon filament 10 is shown in FIGS. 4A and 4B. The apparatus includes an oven 40, a coating tank 42, a supply spool 44 and tension motor 46, and a take up spool 48. Oven 40 is divided into four sections, an upper and lower front section and an upper and lower rear section with each section having individual temperature control. The nylon filament 10 which is to be coated is carried on a supply spool 44 which is coupled to tension motor 46 and the function of which is to supply a constant tension to the nylon filament during the coating operation. Coating tank 42 is filled with a ferrite paint, for example, a paint containing the storage medium 12 of FIGS. 1B and 2B. The take up spool 48 is motor driven to pull the nylon filament 10 through the tank and oven 40. The filament 10 first passes over one of a series of idler pulleys 50 and one of a group of positioning rollers 51 and then through the coating tank 42. This tank includes a grooved roller 42A through which the filament 10 passes and by which the filament is coated with the ferrite paint. A rotating brush 42B is mounted below roller 42A and serves to continuously clean out the grooves in the roller to avoid packing of the paint. This brush also continuously stirs the paint in the tank. The paint is maintained in the tank at a level below the top of the roller 42A. Each of the positioning rollers 51 may be pivoted upward from the position shown to cause the filament to pass above the level of the roller so that it is not coated as it passes through the tank.

After passing through the tank 42, assuming the first roller 51 is down and a ferrite paint coating is applied, the coated filament is then passed through the lower section of oven 40. The rate of feed and the temperature of the oven is such that the ferrite coating is sufficiently dry when it leaves the oven that it does not stick or deform when it passes over the first in a series of idler pulleys 52. The coated nylon structure is then fed back through the upper portion of the oven 40 for further drying and above the tank 42 to the second in the series of idler pulleys 50 to the left of the structure. The operation is repeated, the filament being fed back and forth a total of nine times receiving coatings during five of these passes from left to right assuming each of the rollers 51 is in the downward position shown.

The operation is then continued for ten more passes through the oven during which the nylon filaments pass from left to right in the lower rear section of the oven and then from left to right in the upper rear section of the oven to complete drying of the ferrite paint on the nylon substrate. Upon completion of this operation, the coated filament 10 is on the supply spool 48 and the operation may be repeated with a different ferrite paint to supply a second coating, for example, that of barrier material 14 of FIGS. 1C and 2C. Finally, if the processing of FIGS. 1A–1I is being carried out the layer of non-magnetic ferrite material 16 in the form of a paint is applied on top of the barrier layer 14. The thickness of the particular layer being applied is determined by the viscosity of the paint, the speed at which the filament is pulled through the grooved roller 42A in the tank 42 and also upon the position of rollers 51 which determine the number of actual coatings applied. When all of the necessary coatings have been applied, the filament 10 is cut into desired lengths for use in the processes such as have been described above with reference to FIGS. 1A–1I and 2A–2G.

*Molding apparatus*

FIG. 5 provides a general illustration of the manner in which a number of filaments 10 coated with the two layers 12 and 14, as shown in FIG. 2C are molded into a block of non-magnetic ferrite material 30 (FIG. 2D). The coated substrates 10 are initially arranged in parallel alignment using combs 64 and 66 and placed in a lower mold 60. Each end of the mold is provided with a spacer 68 for holding the nylon filaments in the center of the casting cavity which is formed when an upper mold 62 is placed on lower mold 60. This cavity is filled with a non-magnetic ferrite suspended in an epoxy resin which completely surrounds the coated filaments 10. The mold is then wrapped in aluminum foil to avoid evaporation of the solvents in the casting mix and is then placed in an oven at 90° C. for a period of about 12 hours.

The casting is then removed from the mold as indicated in FIG. 5 and the trapped solvents are evaporated by heating for 30 minutes at approximately 100° C. The casting is then placed back in the mold which is used as a clamp as the coated filaments 10 are pulled from the casting. This extraction of the nylon filaments is accomplished by first cutting the filaments at one end of the casting and then pulling them from the other end. Thereafter the casting with the tubes 12 of magnetic memory material separated from supporting block 30 of non-magnetic ferrite by the barrier tubes 14 is sliced as shown in FIG. 2D or cut through the middle of the tubes if a structure of the type shown in FIG. 3A is to be fabricated.

*Materials (FIGS. 1A–1I)*

In carrying out the processes of FIGS. 1A–1I three successive coatings 12, 14 and 16 are applied in the coating tank of FIGS. 4A and 4B to the nylon substrate 10. The paint used in each of the coatings is prepared by first providing a powder of the material to be coated and thereafter suspending this powder in a liquid carrier to form a paint. In one preferred mode of practicing the invention to produce small storage cores of significantly improved characteristics, the following materials and method of preparation have been employed. The ferrite powder which is to be used to form the magnetic memory coating 12 has the following composition $$Fe_{1.62}Mn_{.80}Cu_{.45}Zn_{.10}Bi_{.02}La_{.01}O_4$$

This powder is formed by mixing together constituents as shown in the table below.

| | Wt. in grams |
|---|---|
| $Fe_2O_3$ | 515.2 |
| $MnCO_3$ | 384.0 |
| $CuO$ | 143.16 |
| $ZnO$ | 32.56 |
| $Bi_2O_3$ | 18.64 |
| $LaFeO_3$ | 9.72 |

This mixture is first milled for two hours in a steel ball mill using approximately 2 cc. of deionized water per gram of powder and steel balls. The resulting slurry is dried under infrared lamps in stainless steel pans. The dried powder is then mashed and put through a 20 mesh screen, after which it is calcined in a nickel boat at 650° for two hours. Upon completion of the calcining operation the powder is quenched directly by placing the boat on a cold plate and is again milled for four hours in ethyl alcohol using 2 cc. per gram of powder. The resulting slurry is then put through a 325 mesh screen and dried under infrared lamps in stainless steel pans.

The magnetic ferrite powder thus formed and having the composition given above is formulated into a paint by mixing the powder with the constituents listed below.

| | Grams |
|---|---|
| Ferrite powder | 24 |
| Nitrocellulose varnish | 20 |
| Amyl acetate | 24 |
| Dibutyl phthalate | 4 |
| Lauric acid | .5 |

15 7/32" dia. 440 stainless steel balls.

The above mixture is placed in an oscillating ball mill for a period of 15 minutes and thereafter the resulting paint is screened through a 325-mesh screen and is ready for use in the coating apparatus of FIGS. 4A and 4B. This ferrite material when finally fired exhibits not only good magnetic storage properties but also very low magnetostriction which is a very important attribute in view of the very small size of the core structure and the extremely high speeds at which they are operated in memory arrays.

The powder from which the barrier layer 14 used in the process of FIGS. 1A–1I is formed is manganese oxide $Mn_3O_4$. This powder is formed from manganese carbonate $MnCO_3$ which is first placed in powder form into a nickel boat. Care should be taken not to pack the powder too tightly into the boat in order to avoid the possibility of blowing out of the boat. The boat containing the powder is placed into a furnace at 600° C. and the temperature is immediately raised to 850° C. at which temperature it is maintained for about one hour. The material is then quenched directly and milled for sixteen hours using deionized water (2 cc. per gram). The resulting slurry is put through a 325 mesh screen and dried under infrared lamps in stainless steel pans. This powder $Mn_3O_4$ is formulated into a paint in exactly the same manner as was the ferrite material described above. That is 24 grams of the powder are formulated with the other constituents of the process described above to obtain the paint used to apply the barrier material to the nylon substrate with the coating apparatus of FIGS. 4A and 4B.

The non-magnetic ferrite tubular shell of the process of FIGS. 1A–1I has the following composition:

$$Fe_{1.20}Mn_{.78}Cu_{.3}Zn_{.7}Bi_{.02}O_4$$

This powder is formed using the same method described above to form the magnetic ferrite powder used for the magnetic memory layer 12, that is oxides of the various constituents are mixed together in the proper proportions by weight and thereafter milled, heated, etc. as described above. The powder is formed into a paint again using the same formulations with 24 grams of powder being mixed with the same constituents to form the paint used to apply the coating of magnetic ferrite 12 to the substrate 10.

In carrying out the processes of FIGS. 1A–1I with the materials prepared as described above, the oven 40 of FIGS. 4A and 4B has its four sections maintained at the following temperatures: the lower front section is maintained at 70° C., the upper front section at 80° C. and both the upper and lower back sections at 85° C.

*Materials (FIGS. 2A–2G; 3A and 3B)*

In carrying out the preferred mode of the invention as described above with reference to FIGS. 2A–2G as well as the method used to produce the structure of FIGS. 3A and 3B, the materials are prepared in the following manner:

The ferrite powder used to form the magnetic memory layer 12 is the same as that described above being of the composition $$Fe_{1.62}Mn_{.80}Cu_{.45}Zn_{.10}Bi_{.02}La_{.01}O_4$$

Similarly the powder layer is again formed of the powder manganese oxide $Mn_3O_4$ prepared as described above. Since the process of FIGS. 2A–2G involves a long casting operation to form the new magnetic block 30, it has been found that better results are achieved by using a somewhat different paint mixture employing a two system epoxy as a paint for the ferrite and manganese oxide powders. The resin makes the powder impervious to solvents during the curing of the casting described above with reference to FIG. 5. To form the paint either the ferrite powder or the manganese oxide powder is mixed with the following constituents:

| | | |
|---|---|---|
| Powder | grams | 60 |
| Epoxy resin prepared by reacting epichlorohydrine with Bisphenol A | grams | 14 |
| 4,4′ methylene dianiline | do | 12 |
| Pine oil | do | 25 |
| Epoxidized castor oil | do | .5 |
| Methyl isobutyl ketone | do | 30 |
| Non-ionic detergent | drops | 2 |

The coating of the nylon substrate with the coating tank of FIGS. 4A and 4B is the same as that which has been described above.

It should be noted here that though it has been possible to extract the nylon filament directly from the multilayer tubes encased either in the wax block 20 of FIG. 2E or the ferrite block 30 of FIG. 2D, this operation can be made easier and the danger of damage to the tubes during the extraction is reduced if a release composition is first applied to the nylon substrate before the first coating of magnetic ferrite 12 is applied. This release agent may be formed of a suspension of colloidal wax in water and may be applied using the apparatus of FIGS. 4A and 4B with only the first of the positioning rollers 51 in its lowered position so that only a single coating is applied to the substrate 10.

During the coating operation with the resin type paint described above the four sections of the oven 40 of FIGS. 4A and 4B are maintained at somewhat higher temperatures. Specifically, the lower front section is maintained at 100° C., the upper front section at 110° C. and the upper and lower back sections are both maintained at 125° C.

The powder used to prepare the molding block 30 of non-magnetic ferrite is different than that used to form the supporting shell 16 in the process of FIGS. 1A–1I. This powder has the following composition:

$$Fe_{.8}Mn_{1.48}Cu_{.2}Zn_{.5}Bi_{.02}O_4$$

In order to place this powder into a casting mixture, it is formulated with the constituents shown below:

| | | |
|---|---|---|
| Powder | grams | 20 |
| Pine oil | do | 4.5 |
| Epoxidized castor oil | do | 1.1 |
| Epoxy resin prepared by reacting epichlorohydrine with Bisphenol A | grams | 1.6 |
| 4,4′ methylene dianiline | do | 1.3 |
| Non-ionic detergent | drop | 1 |
| 15 7/32″ dia. 440 stainless steel balls. | | |

The formulation is placed in a shaker mill for about fifteen minutes and then degassed in a vacuum dessicator. The resulting non-magnetic ferrite casting mix is then poured into the upper mold 62 and lower mold 60 of FIG. 5, leveled and then placed back in the dessicator to remove any air bubbles. The molds are then placed together surrounding the coated substrates with the mix and again placed into the dessicator to remove any trapped bubbles between the moulds. The two moulds are then pressed together, the excess mix is removed, and then wrapped in aluminum foil and placed in an oven which is set at 90° C. for 16 hours to cure the casting. The casing may then be stripped from the mold as shown in FIG. 5 and thereafter the process steps described above with reference to FIGS. 2D–2G or 3A and 3B are carried out to complete the fabrication process.

Though the above detailed description includes specific apparatus, materials, and process steps used to illustrate preferred embodiments of the subject invention, the practice of the invention is not limited to the specific details of these embodiments. In practicing the method as described above the use of the barrier layer to separate the ferrite storage layer from the non-magnetic supporting layer results in improved storage cores with extremely good magnetic characteristics of the type required for high speed storage arrays. It is, however, also possible to fabricate devices without the use of the barrier layer that exhibits improved magnetic characteristics usable in many applications.

Further, specific examples of materials used for the various layers have been given, but other materials may be used for each layer without departing from the principles of the invention. Many known ferrite storage materials may be used to provide the storage layer though it has been found that materials such as the one described above which can be fired at relatively low temperatures and has very low magnetostriction are particularly suitable. Similarly a large number of materials are available for use as supporting layers, it being pointed out, however, that the supporting layer material should be chosen to avoid any interaction with the storage layer and it is preferable that it exhibit shrinkage characteristics similar to that of the storage layer. The barrier layer should itself be inert and serve the function of preventing interaction between the other two layers during the sintering operation. Though the magnesium oxide described serves this function, other materials may be also employed including for example $Cr_2O_3$; mixtures of $Mn_3O_4$ and $Cr_2O_3$ and mixtunres of ZnO and $Mn_3O_4$.

While the invention has been particularly shown and described with reference to preferred embodiments thereof, it will be understood by those skilled in the art that various changes in form and details may be made therein without departing from the spirit and scope of the invention.

What is claimed is:

1. The method of fabricating magnetic ferrite storage devices comprising the steps of:

applying to a substrate a first layer containing ferrite magnetic material;

applying to said substrate over said first layer a second layer containing a barrier material;

applying to said substrate over said second layer a third layer containing a nonmagnetic ferrite material;

and sintering said layers to form a multi-layer structure with the first of said layers exhibiting storage properties, said first and third layers having essentially the same shrinkage characteristics, and the second of said layers preventing interaction between said first and third layers during said sintering operation.

2. The method of claim 1 including the further step of removing said substrate from said multi-layered structure prior to said sintering operation.

3. The method of claim 1 wherein said substrate is tubular and said first, second, and third layers are applied to said substrate to form a multi-layered tubular structure;

and including the step of slicing said multi-layered tubular structure to form individual multi-layer storage cores prior to said sintering operation.

4. The method of claim 3 including the further steps of molding said multi-layered tubular structure in a wax block prior to said slicing step, and removing said multi-layered storage cores from said wax block after they are sliced and before said sintering operation.

5. The method of claim 1 wherein said barrier layer is manganese oxide.

6. The method of forming a multi-layer storage device of the type in which a thin walled storage core of ferrite magnetic material is supported in a body of non-magnetic ferrite comprising the steps of:

forming a multi-layer structure with the ferrite magnetic material for the storage core and the non-magnetic ferrite material of the supporting body in a green state with a layer of a barrier material separating said ferrite materials;

sintering said multi-layer structure, said magnetic ferrite material and said supporting non-magnetic ferrite material having the same shrinkage characteristic, and said barrier material preventing interaction between the magnetic ferrite material and the supporting non-magnetic ferrite material during the sintering operation.

7. The method of claim 6 wherein said storage core, said barrier layer, and said supporting non-magnetic layer are first formed by coating a substrate successively with a liquid carrier containing said ferrite storage material, a liquid carrier containing said barrier material and a liquid carrier containing said non-magnetic ferrite material.

8. The invention of claim 6 wherein said storage core, said barrier layer, and said supporting non-magnetic layer are first formed by coating a substrate first with a liquid carrier containing the ferrite storage material and then with a liquid carrier containing the barrier material and then casting said coated substrate in a mix containing said non-magnetic ferrite supporting material.

9. The invention of claim 6 wherein said barrier layer is manganese oxide.

10. A method of fabricating magnetic storage devices comprising the steps of:

forming a plurality of multi-layer tubes by coating each of a plurality of tubular substrates with a first layer containing magnetic ferrite material and on top of said first layer a second layer of inert non-magnetic material;

mounting said plurality of multi-layer tubes aligned with each other in a block of non-magnetic ferrite material;

slicing said block and said tubes;

sintering said sliced tubes, said magnetic ferrite material of said first layer and said non-magnetic material of said block having the same shrinkage characteristics, and said layer of inert non-magnetic material preventing interaction between said first layer of magnetic ferrite material and the non-magnetic ferrite block during said sintering.

References Cited

UNITED STATES PATENTS

| | | | |
|---|---|---|---|
| 3,016,597 | 1/1962 | Denes. | |
| 3,055,770 | 9/1962 | Sankuer et al. | 340—174 X |
| 3,099,874 | 8/1963 | Schweizerhof | 340—174 X |
| 3,161,946 | 12/1964 | Birkenbeil. | |
| 3,183,567 | 5/1965 | Riseman et al. | 29—604 |
| 3,197,335 | 7/1965 | Leszynski. | |
| 3,224,073 | 12/1965 | Peloschek | 29—603 |
| 2,711,966 | 6/1955 | Watson et al. | |

JOHN F. CAMPBELL, *Primary Examiner.*

D. C. REILEY, *Assistant Examiner.*

UNITED STATES PATENT OFFICE
CERTIFICATE OF CORRECTION

Patent No. 3,392,441 July 16, 1968

Edward A. Bartkus et al.

It is certified that error appears in the above identified patent and that said Letters Patent are hereby corrected as shown below:

Column 2, line 34, "206,306" should read -- 206,326 --; line 35, "3,231,661" should read -- 3,229,265 --.

Signed and sealed this 10th day of March 1970.

(SEAL)
Attest:

Edward M. Fletcher, Jr.
Attesting Officer

WILLIAM E. SCHUYLER, JR.
Commissioner of Patents